US007024670B1

(12) United States Patent
Leymann et al.

(10) Patent No.: US 7,024,670 B1
(45) Date of Patent: Apr. 4, 2006

(54) TIMED START-CONDITIONS FOR ACTIVITIES IN WORKFLOW MANAGEMENT SYSTEMS

(75) Inventors: Frank Leymann, Aidlingen (DE); Dieter Roller, Schoenaich (DE)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/396,245

(22) Filed: Sep. 15, 1999

(30) Foreign Application Priority Data

Dec. 17, 1998 (EP) ................................ 98123971

(51) Int. Cl.
*G06F 9/46* (2006.01)
*G06F 17/60* (2006.01)
*G06F 9/44* (2006.01)

(52) U.S. Cl. ......................... 718/102; 718/100; 705/1; 705/8; 717/102

(58) Field of Classification Search ........... 709/1–108; 395/200, 182; 707/1; 705/1–45; 718/100–108; 717/102

See application file for complete search history.

(56) References Cited

U.S. PATENT DOCUMENTS 5,301,320 A * 4/1994 McAtee et al. ................ 705/9
5,581,691 A * 12/1996 Hsu et al. ..................... 714/15
5,799,297 A * 8/1998 Goodridge et al. ............ 707/1
5,870,545 A * 2/1999 Davis et al. ................ 709/201
6,041,306 A * 3/2000 Du et al. ....................... 705/8
6,314,434 B1 * 11/2001 Shigemi et al. ............. 707/203
6,601,035 B1 * 7/2003 Panagos et al. ................ 705/8

* cited by examiner

*Primary Examiner*—Meng-Al T. An
*Assistant Examiner*—Kenneth Tang

(57) ABSTRACT

The present invention relates to a method for processing of start conditions of activities within a process model processable by a Workflow Management System (WFMS); said process model comprises activities being nodes of an graph and directed control connectors defining a potential control flow. The method evaluates, if a target-activity may be started, by evaluating the truth-value of a start-condition once the truth-values of all incoming control-connectors of said target-activity have been posted. A further timed-evaluation-step evaluates, if at least a first one of said incoming control-connectors is associated with a time-interval, and if said time-interval has been met. In the affirmative case said timed-evaluation-step continues the processing to start said target-activity even if not all truth-values of said incoming control-connectors have been posted yet under the condition, that the truth-value of said first incoming control-connector has been posted and that said truth-value evaluates to TRUE.

10 Claims, 2 Drawing Sheets

```
                 301         303
PROGRAM_ACTIVITY Print Contract                               302
  START
    TIMED FROM ACTIVITY Collect Customer Information
      AFTER 14 DAYS                                           304
               FOR ACTIVITY Process Car Insurance
      AFTER 21 DAYS                                          305
               FOR ACTIVITY Process Life Insurance
      AFTER 28 DAYS
               FOR ACTIVITY Process House Insurance
```

FIG. 3

```
PROGRAM_ACTIVITY Print Contract
  START
    TIMED
      AFTER 14 DAYS          401
        FOR PATH ACTIVITY Collect Customer Information
                 ACTIVITY Process Car Insurance
      AFTER 21 DAYS          402
        FOR PATH ACTIVITY Collect Customer Information
                 ACTIVITY Process Life Insurance
      AFTER 28 DAYS          403
        FOR PATH ACTIVITY Collect Customer Information
                 ACTIVITY Process House Insurance
  END Print Contract
```

FIG. 4

TIMED START-CONDITIONS FOR ACTIVITIES IN WORKFLOW MANAGEMENT SYSTEMS

1 BACKGROUND OF THE INVENTION

1.1 Field of the Invention

The present invention relates to a method for processing of start conditions of activities within a process model processable by a Workflow Management System (WFMS) or a computer system with comparable functionality.

1.2 Description and Disadvantages of Prior Art

A new area of technology with increasing importance is the domain of Workflow-Management-Systems (WFMS). WFMS support the modeling and execution of business processes. Business processes control which piece of work of a network of pieces of work will be performed by whom and which resources are exploited for this work, i.e. a business process describes how an enterprise will achieve its business goals. The individual pieces of work might be distributed across a multitude of different computer systems connected by some type of network.

The correct and efficient execution of business processes within a company, e.g. development or production processes, is of enormous importance for a company and has significant influence on company's overall success in the market place. Therefore, those processes have to be regarded similar as technology processes and have to be tested, optimized and monitored. The management of such processes is usually performed and supported by a computer based process or workflow management system.

The "IBM FlowMark for OS/2", document number GH 19-8215-01, IBM Corporation, 1994, available in every IBM sales office, represents a typical modern, sophisticated, and powerful workflow management system. It supports the modeling of business processes as a network of activities; refer for instance to "Modeling Workflow", document number SH 19-8241, IBM Corporation, 1996. As further information on Workflow Management Systems available in IBM sales offices one could mention: IBM MQSeries Concepts and Architecture, document number GH 12-6285; IBM MQSeries Getting Started with Buildtime, document number SH 12-6286; IBM MQSeries Getting Started with Runtime, document number SH 12-6287. This network of activities, the process model, is constructed as a directed, acyclic, weighted, colored graph. The nodes of the graph represent the activities or workitems which are performed. The edges of the graph, the control connectors, describe the potential sequence of execution of the activities. Definition of the process graph is via the IBM FlowMark Definition Language (FDL) or the built-in graphical editor. The runtime component of the workflow manager interprets the process graph and distributes the execution of activities to the right person at the right place, e.g. by assigning tasks to a work list according to the respective person, wherein said work list is stored as digital data within said workflow or process management computer system.

For implementing a computer based process management system, firstly the business processes have to be analyzed and, as the result of this analysis, a process model has to be constructed as a network of activities corresponding to the business process. In the IBM FlowMark product, the process models are not transformed into an executable. At run time, an instance of the process is created from the process model, called a process instance. This process instance is then interpreted dynamically by the IBM FlowMark product.

A user typically interacts with the workflow management system via a graphical end user that represents the tasks to be performed by the user as icons. Work for a particular task is started by the user by double-clicking on the appropriate icon which in turn starts the program implementing the activity.

As outlined above within a process model control connectors connect one activity, the source activity, with another activity, the target activity. If an activity is the source of multiple control connectors, the activity is called a fork activity. All activities that are target activities of the control connectors leaving the fork activity, are executed in parallel. An activity that is the target of multiple control connectors is called a join activity. All activities are associated with conditions that define when the activity can be carried out and when the activity has completed successfully. Join activity have an additional condition that defines when an activity with incoming control connectors can start. This condition is called a start condition. Only if evaluation of the start condition evaluates to TRUE the actual processing of the target activity can be started, for instance by proceeding with the processing of activation conditions, which may specify additional criteria that must be met before the target activity can be carried out.

The following approaches of treating start conditions are known in the state of the art:

Only MQSeries Workflow supports start conditions as part of its meta model, i.e. within the process model. All other workflow management systems do not support this type of condition for activities. In this latter case, the activation condition is checked immediately after one control connector has entered the join node; in other words, no start condition processing is offered as processing of the target activities is started immediately once one control connector is posting a logical value of TRUE to the target activity. The workflow does not wait for other control connectors to enter the activity. If a second control connector enters the activity, the activity is carried out a second time. It is the responsibility of the process designer to make sure that this either does not happen or that the second processing of the activity does not produce any negative effects. MQSeries Workflow implements a simple version of a start condition. The join activity is treated as a synchronization point. Evaluation of the start condition is not performed until all incoming control connectors have entered the activity. The only two settings that the start condition supports are ALL or LEAST ONE. If ALL is specified, all incoming control connectors must have evaluated to TRUE; if AT LEAST ONE is specified, at least one of the incoming control connectors must have been evaluated to TRUE.

Neither approach, that means no start conditions at all or the synchronization type of start condition, is completely satisfactory. With the current technology not all types of relationships between incoming control connectors can be handled. Thus the current technology requires that the activity itself would have to take over certain checks with respect to the status of other incoming control connectors; this contradicts the fundamental approach of WFMS, namely to extract from a network of interacting activities all control information with respect to that interaction making the individual activities self-contained programs with respect to that interaction.

1.3 Objective of the Invention

The invention is based on the objective to improve capabilities for defining and for computation of start conditions of activities within a process model processed by a Workflow Management System (WFMS).

2 SUMMARY AND ADVANTAGES OF THE INVENTION

The objectives of the invention are solved by claim 1. Further advantageous arrangements and embodiments of the invention are set forth in the respective subclaims.

The invention relates to a computerized method for processing of start-conditions processed by a computer systems acting as a Workflow-Management-System (WFMS) or a computer system with comparable functionality. The WFSM comprises at least one process-model said process-model comprising one or more process-activities being nodes of an arbitrary graph and directed control-connectors of said graph define a potential control flow within said process-model. The method evaluates, if a target-activity may be started, by evaluating the truth-value of a start-condition once the truth-values of all incoming control-connectors of said target-activity have been posted. As this behavior is not satisfactory in all cases the proposed method further comprises a timed-evaluation-step. Said timed-evaluation-step evaluates, if at least a first one of said incoming control-connectors is associated with a time-interval, and if said time-interval has been met. In the affirmative case said timed-evaluation-step continues the processing to start said target-activity even if not all truth-values of said incoming control-connectors have been posted yet under the condition, that the truth-value of said first incoming control-connector has been posted and that said truth-value evaluates to TRUE.

The proposed method according to the current invention supports deviation from the processing of start conditions according to the state of the art. Of course the state of the art processing, according to which a WFMS would wait until all truth values of all incoming control connectors of a target activity would have been posted before it decides to start the target activity dependent on the overall truth value, is still available. In addition the current teaching allows to model time dependent inter-relations between incoming control connectors, whereas the current state of the art is limited to static conditions only. If a certain time value has been exceeded the current method allows a WFMS to start the target activity in response to the posted truth value of an incoming control connector even if the WFMS is still waiting for truth value of other incoming control connectors. In essence the method allows to model a guaranteed time behavior of the WFMS. A high degree of granularity is offered as each incoming control connector may be associated with an individual time interval. Time dependencies with respect to incoming control connectors, which would have to be handled according current state of the art within the process activities themselves, can now be handled on the workflow management system level; they thus have been made explicit on the global level of process models no longer “hidden” within the activity implementations.

Additional advantages are achieved if the first incoming control-connector is associated with a commencing-activity, and said timed-evaluation-step uses as starting point for said time-interval the point in time when said commencing-activity is completed.

Thus the proposed method allows to use a well-defined point in time as point of reference to evaluate if the specified time interval has elapsed.

Additional advantages are achieved if said first incoming control-connector is associated with a path from said commencing-activity to said target-activity. In this case said timed-evaluation-step is continuing the processing to start said target-activity, if exactly said associated path has been traversed.

Due to this teaching the selectivity of the current method is increased. The current method is not only responsive to the posted truth value of an incoming control connector even more the method’s behavior is depending on the particular path of the flow of control along controller connectors.

3 BRIEF DESCRIPTION OF THE DRAWINGS

Figure 2:
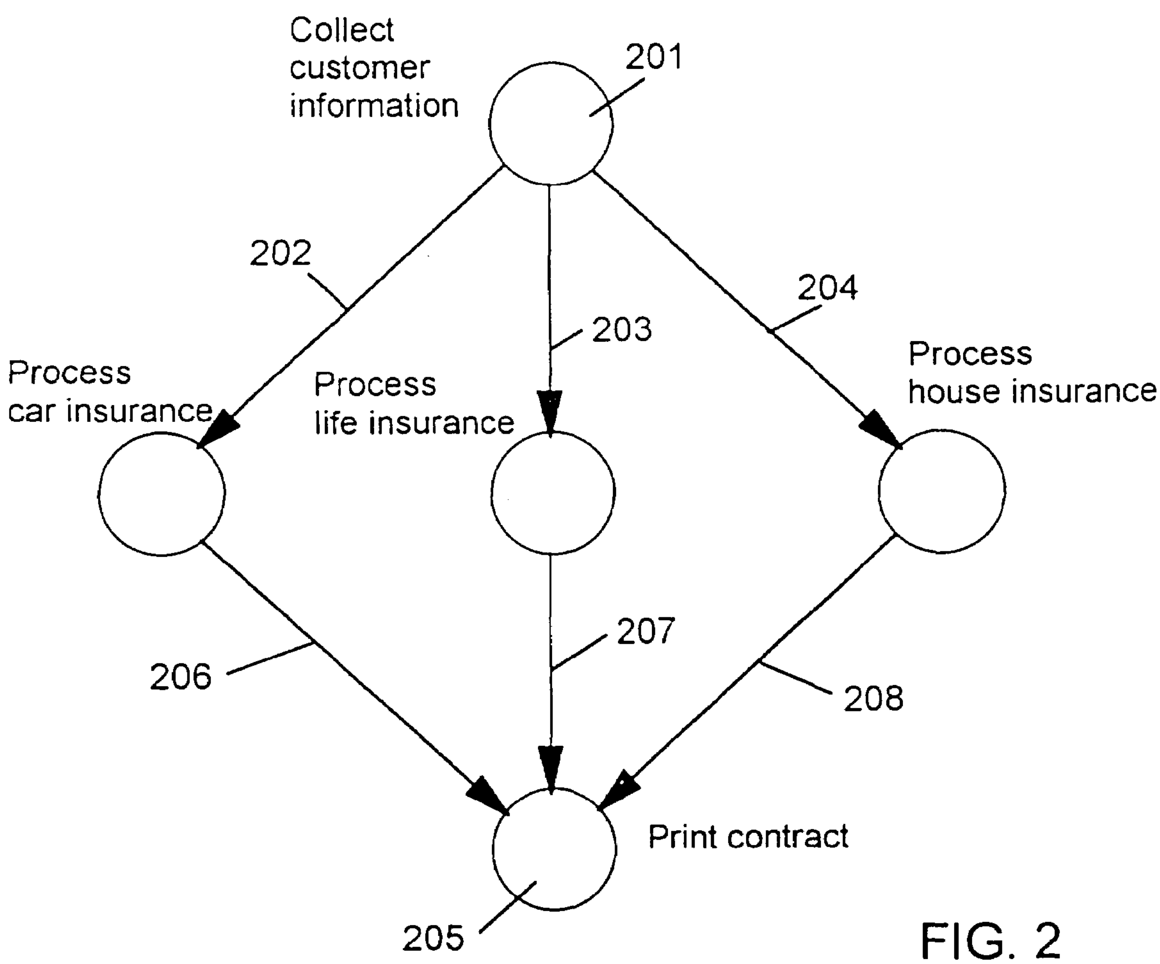
FIG. 2 shows a typical business process in the insurance industry used for working out the deficiencies of the current state of the art.

FIG. 3 visualizes new language constructs according the current invention for timed evaluation of start conditions for the example of FIG. 2.

FIG. 4 visualizes a more complex situations than within FIG. 3, where the timed evaluation of start conditions is responsive to a certain path taken by the control flow from a commencing activity to the target activity.

4 DESCRIPTION OF THE PREFERRED EMBODIMENT

The current invention is illustrated based on IBM’s FlowMark workflow management system. Of course any other WFMS could be used instead. Furthermore the current teaching applies also to any other type of system which offers WFMS functionalities not as a separate WFMS but within some other type of system.

4.1 Introduction

The following is a short outline on the basic concepts of a workflow management system based on IBM’s FlowMark WFMS:

From an enterprise point of view the management of business processes is becoming increasingly important: business processes or process for short control which piece of work will be performed by whom and which resources are exploited for this work, i.e. a business process describes how an enterprise will achieve its business goals. A WFMS may support both, the modeling of business processes and their execution.

Modeling of a business process as a syntactical unit in a way that is directly supported by a software system is extremely desirable. Moreover, the software system can also work as an interpreter basically getting as input such a model: The model, called a process model or workflow model, can then be instantiated and the individual sequence of work steps depending on the context of the instantiation of the model can be determined. Such a model of a business process can be perceived as a template for a class of similar processes performed within an enterprise; it is a schema describing all possible execution variants of a particular kind of business process. An instance of such a model and its interpretation represents an individual process, i.e. a concrete, context dependent execution of a variant prescribed by the model. A WFMSs facilitates the management of business processes. It provides a means to describe models of business processes (build time) and it drives business processes based on an associated model (run time). The meta model of IBM’s WFMS FlowMark, i.e. the syntactical elements provided for describing business process models, and the meaning and interpretation of these syntactical elements, is described next.

A process model is a complete representation of a process, comprising a process diagram and the settings that define the logic behind the components of the diagram. Using various services provided by FlowMark these buildtime definitions the process models are then converted into process templates for use by FlowMark at runtime. Important components of a FlowMark process model are:

Processes
Activities
Blocks
Control Flows
Connectors
Data Containers
Data Structures
Conditions
Programs
Staff Not all of these elements will be described below.

On this background a process, modeled by a process model within FlowMark, is a sequence of activities that must be completed to accomplish a task. The process is the top-level element of a FlowMark workflow model. In a FlowMark process, it can be defined:

How work is to progress from one activity to the next

Which persons are to perform activities and what programs they are to use

Whether any other processes, called subprocesses, are nested in the process

Of course multiple instances of a FlowMark process can run in parallel.

Activities are the fundamental elements of the meta model. An activity represents a business action that is from a certain perspective a semantic entity of its own. With the model of the business process it might have a fine-structure that is then represented in turn via a model, or the details of it are not of interest at all from a business process modeling point of view. Refinement of activities via process models allows for both, modeling business processes bottom-up and top-down. Activities being a step within a process represents a piece of work that the assigned person can complete by starting a program or another process. In a process model, the following information is associated with each activity:

What conditions must be met before the activity can start

Whether the activity must be started manually by a user or can start automatically What condition indicates that the activity is complete Whether control can exit from the activity automatically or the activity must first be confirmed as complete by a user How much time is allowed for completion of the activity Who is responsible for completing the activity Which program or process is used to complete the activity What data is required as input to the activity and as output from it A FlowMark process model consists of the following types of activities:

Program activity: Has a program assigned to perform it. The program is invoked when the activity is started. In a fully automated workflow, the program performs the activity without human intervention. Otherwise, the user must start the activity by selecting it from a runtime work list. Output from the program can be used in the exit condition for the program activity and for the transition conditions to other activities.

Process activity: Has a (sub-)process assigned to perform it. The process is invoked when the activity is started. A process activity represents a way to reuse a set of activities that are common to different processes. Output from the process, can be used in the exit condition for the process activity and for the transition conditions to other activities.

The flow of control, i.e. the control flow through a running process determines the sequence in which activities are executed. The FlowMark workflow manager navigates a path through the process that is determined by the evaluation to TRUE of start conditions, exit conditions, and transition conditions.

The results that are in general produced by the work represented by an activity is put into an output container, which is associated with each activity. Since an activity will in general require to access output containers of other activities, each activity is associated in addition with an input container too. At run time, the actual values for the formal parameters building the input container of an activity represent the actual context of an instance of the activity. Each data container is defined by a data structure. A data structure is an ordered list of variables, called members, that have a name and a data type. Data connectors represent the transfer of data from output containers to input containers. When a data connector joins an output container with an input container, and the data structures of the two containers match exactly, the FlowMark workflow manager maps the data automatically.

Connectors link activities in a process model. Using connectors, one defines the sequence of activities and the transmission of data between activities. Since activities might not be executed arbitrarily they are bound together via control connectors. A control connector might be perceived as a directed edge between two activities; the activity at the connector's end point cannot start before the activity at the start point of the connector has finished (successfully). Control connectors model thus the potential flow of control within a business process model. Default connectors specify where control should flow when the transition condition of no other control connector leaving an activity evaluates to TRUE. Default connectors enable the workflow model to cope with exceptional events. Data connectors specify the flow of data in a workflow model. A data connector originates from an activity or a block, and has an activity or a block as its target. One can specify that output data is to go to one target or to multiple targets. A target can have more than one incoming data connector.

Conditions are the means by which it is possible to specify the flow of control in a process. In FlowMark process models logical expressions can be defined that are evaluated by FlowMark at runtime to determine when an activity may start, end, and pass control to the next activity. Start conditions are conditions that determine when an activity with incoming control connectors can start. The start condition may specify that all incoming control connectors must evaluate to TRUE, or it may specify that at least one of them must evaluate to TRUE. Whatever the start condition is, all incoming connectors must be evaluated before the activity can start. If an activity has no incoming control connectors, it becomes ready when the process or block containing it starts. In addition, a Boolean expression called transition condition is associated with each control connector. Parameters from output containers of activities having already produced their results are followed as parameters referenced in transition conditions. When at run time an activity terminates successfully all control connectors leaving this activity are determined and the truth value of the associated transition conditions is computed based on the actual values of their parameters. Only the end points of control connectors the transition conditions of which evaluated to TRUE are considered as activities that might be executed based on the actual context of the business process. Transition conditions model thus the context dependent actual flow of control within a business process (i.e. an instance of a model). Business processes encompass long running activities in general; such an activity need to be allowed to become interrupted. Thus, termination of an activity does not necessarily indicate that the associated task has been finished successfully. In order to allow the measurement of successfulness of the work performed by an activity a Boolean expression called exit condition is associated with each activity. Exactly the activities the exit condition of which evaluated to TRUE in the actual context are treated as successfully terminated. For determination of the actual control flow precisely the successfully terminated activities are considered. Thus the logical expression of an exit condition, if specified, must evaluate to TRUE for control to pass from an activity or block.

Beside describing the potential flow of control and data between activities a business process model also encompasses the description of the flow of the activities itself between "resources" actually performing the pieces of work represented by each activity. A resource may be specified as a particular program, person, a role, or an organizational unit. At run time tasks are resolved into requests to particular persons to perform particular activities resulting in workitems for that person. Staff assignments are the means to distribute activities to the right people in the sequence prescribed by the control flow aspect of a business process model. Each activity in a process is assigned to one or more staff members defined in the FlowMark database. Whether an activity is started manually by the user or automatically by the FlowMark workflow manager, and whether it requires user interaction to complete or completes automatically, a staff member must be assigned to it. FlowMark staff definition entails more than identifying people at your enterprise to the FlowMark database. For each person defined, you can specify a level, an organization, and multiple roles. These attributes can be used at run time to dynamically assign activities to people with suitable attributes.

Process definition includes modeling of activities, control connectors between the activities, input/output container, and data connectors. A process is represented as a directed acyclic graph with the activities as nodes and the control/data connectors as the edges of the graph. The graph is manipulated via a built-in, event-driven, CUA compliant graphic editor. The data containers are specified as named data structures. These data structures themselves are specified via the DataStructureDefinition facility. FlowMark distinguishes three main types of activities: program activities, process activities, and blocks. Program activities are implemented through programs. The programs are registered via the Program Definition facility. Blocks contain the same constructs as processes, such as activities, control connectors etc. They are however not named and have their own exit condition. If the exit condition is not met, the block is started again. The block thus implements a Do Until construct. Process activities are implemented as processes. These subprocesses are defined separately as regular, named processes with all its usual properties. Process activities offer great flexibility for process definition. It not only allows to construct a process through permanent refinement of activities into program and process activities (top-down), but also to build a process out of a set of existing processes (bottom-up). In particular, process activities help to organize the modeling work if several process modeler are working together. It allows the team members to work independently on different activities. Program and process activities can be associated with a time limit. The time limit specifies how long the activity may take. If the time is exceeded, a designated person is notified. If this person does not react within another time limit, the process administrator is notified. It not only helps to recognize critical situation but also to detect process deficiencies as all notifications are recorded in an audit trail.

All data structures used as templates for the containers of activities and processes are defined via the Data Structure Definition Facility. Data Structures are names and are defined in terms of elementary data types, such as float, integer, or string and references to existing data structures. Managing data structures as separate entities has the advantage that all interfaces of activities and their implementations are managed consistently in one place (similar to header files in programming languages).

All programs which implement program activities are defined via the Program Registration Facility. Registered for each program is the name of the program, its location, and the invocation string. The invocation string consists of the program name and the command string passed to the program.

Before process instances can be created, the process model must be translated to ensure the correctness and completeness of the process model. The translated version of the model is used as a template when a process instance is created. This allows to make changes to the process model without affecting executing process instances. A process instance is started either via the graphical interface of via the callable process application programming interface. When a process is started, the start activities are located, the proper people are determined, and the activities are posted onto the work list of the selected people as work items. If a user selects the work item, i.e. the activity, the activity is executed and removed from the work list of any other user to whom the activity has been posted. After an activity has executed, its exit condition is evaluated. If not met, the activity is rescheduled for execution, otherwise all outgoing control connectors and the associated transition conditions are evaluated. A control connector is selected, if the condition evaluates to TRUE. The target activities of the selected control connectors are then evaluated. If their start conditions are TRUE, they are posted to the work list of selected people. A process is considered terminated, if all end activities have completed. To make sure that all end activities finish, a dead path elimination is performed. It removes all edges in the process graph which can never be reached due to failing transition conditions. All information about the current state of a process is stored in the database maintained by the server. This allows for forward recovery in the case of crashes.

4.2 The Join Activity Structure

Figure 1:
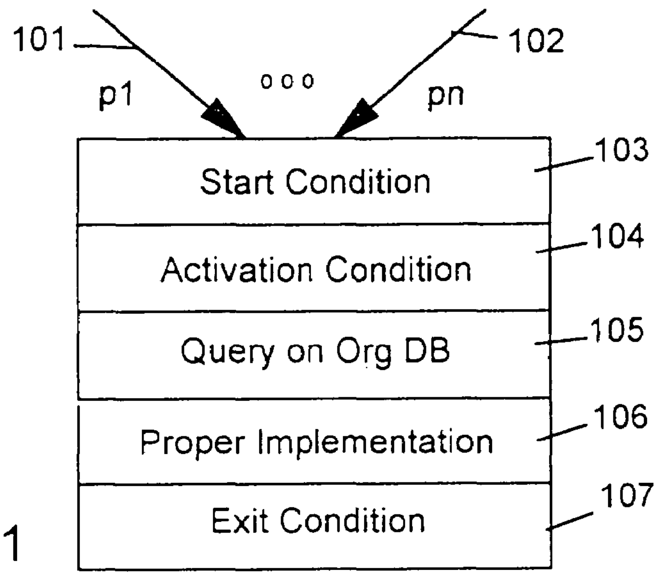
FIG. 1 is a diagram reflecting the processing related to a “join activity”.

The processing related to a join activity has the global structure shown in FIG. 1.

In general, not all of the properties are part of the meta models that are implemented by the different workflow management systems. In fact, there does not seem to be one particular workflow management system that supports all of them. Specification of a particular property is in general not mandatory; typically defaults are taken if nothing is specified.

FIG. 1 shows N control connectors p1 (101) to pn (102) entering a join activity. The start condition (103) defines which control connectors must have entered the activity and what their appropriate truth value must be. More details are provided in the next section.

The activation condition (104) specifies the criteria that must be met before the activity can be carried out. The activation condition is not evaluated until the start condition has been evaluated to TRUE. The query against the organization DB (staff assignment) (105) defines who should be assigned to carry out the activity. The actual implementation (106) is the program or process that is used when the activity is carried out. The exit condition (107) specifies the criteria which must be met before the activity can be completed. The different properties are carried out in the shown sequence; that means from top to bottom.

As already pointed out, start conditions are either not known in state of the art WFMS or an insufficient technology is available only.

In the first case, the activation condition is checked immediately after one control has entered the join node. The workflow does not wait for other control connectors to enter the activity. If a second control connector enters the activity, the activity is carried out a second time. It is the responsibility of the process designer to make sure that this either does not happen or that the second processing of the activity does not produce any negative effects. In the second case, the only two settings that the start condition supports are "ALL" or "AT LEAST ONE". If "ALL" is specified, all incoming control connectors must have evaluated to TRUE; if "AT LEAST ONE" is specified, at least one of the incoming control connectors must have been evaluated to TRUE.

4.3 The Solution

FIG. 2 shows a typical business process in the insurance industry used for working out the deficiencies of the current state of the art. Based on the type of insurance that the customer selects in step Collect Customer Information (201), one or more or all of the different paths (202, 203, 204) are processed. Not before all necessary actions have been carried out for the selected insurances, a contract is printed that includes all appropriate contracts for the different insurance types by the activity Print Contract (205).

As a model of a real process this scenario would reflect the ideal behavior for several reasons: (1) Optimal customer satisfaction would be achieved since the customer receives only one contract that contains everything, and (2) only minimal costs for processing the contract would be caused. Modeling of the business process can be done using the available constructs for start conditions; the join activity Print Contract (205) is a synchronization point. The condition is not evaluated until all control connectors (206, 207, 208) have entered the activity (205).

Unfortunately, this ideal processing can not be achieved in all cases. Legislation may for example define that for car insurances the signed contract must be sent to the customer within 14 days, for life insurance within 21 days, and for house insurance within 28 days. Thus the contract must be printed at the latest after 14 days if the contract includes car insurance, regardless of the other insurances that the contract contains. This requires that the start condition is evaluated at least 14 days after the customer has sent in the request.

The above mentioned problem scenario can be handled by a new time property for the start condition. The invention suggests a time-dependent evaluation mechanism of start-conditions allowing to deviate under certain circumstances from the standard behavior; according to the standard behavior first all truth values of the incoming control connectors of a join activity have to be posted before that WFMS evaluates the truth value of the start-conditions (with reference to above example: all truth values of the control connectors (206–208) would have to be posted before the WFMS would evaluate the "Print contract" (205) activity start-condition). Conceptually a standard start condition is a synchronization point with all control connectors ORed together. That means as soon as all incoming control connectors have been evaluated and at least one of them evaluates to TRUE, the activity is carried out.

As deviation from said standard behavior the proposed teaching allows one or more control connectors to be associated with a time interval. Once said time interval has been expired, the processing to start the target activity is continued, even if not all truth values of said incoming control connectors have been posted yet, if the truth value of the incoming control connector (associated with said time interval) has been posted and if said truth value evaluates to TRUE.

FIG. 3 shows how this is specified via new language constructs of the Flow Definition Language of MQSeries Workflow.

This extended start condition behavior is indicated by the keyword TIMED (301) supporting to extend the standard behavior for evaluating the start condition by time specifications. It requires the specification of a reference point for determining the time. This is done by selecting a particular activity which starts the clock; in the example it is the termination of the activity Collect Customer Information (302). The start condition is evaluated after 14 days (303) if the activity Process Car Insurance (304) is carried out. If the activity Process Car Insurance has been completed, the start condition is set to TRUE after 14 days regardless of the settings of the other control connectors and processing of the activity is started. If the activity Process Car Insurance has not been completed, no action is taken; that means the start condition remains un-evaluated and the system waits until the next control connector enters the join activity or the next time is activated (for example after 21 days for the Process Loan Insurance activity). Thus in essence the proposed teaching suggests to deviate from the standard behavior of processing of start-conditions if a time interval has expired, which is associated with an incoming control connector, whose truth value has been posted as TRUE. In this case the standard behavior is overwritten and the target activity is started. The WFMS still is waiting for the posting of the other incoming control connectors, if their truth values have not been posted yet.

As an option, an alert could be issued or the process could be set into an InError state to prevent any further processing.

This process of treating the activity as a synchronization point and evaluating it at specified times is repeated until all control connectors have been evaluated.

Notification can be set to make sure that appropriate actions are taken when the specified dead lines can not be met. One could for example specify that a notification is sent out of if the Process Car Insurance activity has not been completed 12 days after the Collect Customer Information activity has started.

It is obvious, that due to the proposed invention the join activity can be carried out multiple times. This requires extensions to the appropriate application programming interfaces so that the activity implementation can determine the context in which is invoked. This context includes among other information which control connectors have been evaluated to TRUE since the last invocation.

The above specification assumes a common fork activity and only one activity between the fork activity and the join activity. The proposed invention can readily be extended to more complex situations, where the timed evaluation of start conditions is responsive to a certain path taken by the control flow from a commencing activity to the target activity. Such an extension is shown in FIG. 4 reflecting more granular definitions. As can be seen, the complete path is specified for each of the control connectors. Based on this specifications the timed evaluation is continuing the processing to start of the target activity, if said associated path has been traversed. As an example, referring to FIG. 4, the target activity "Print contract" is started after 14 days (if the truth value of TRUE of the incoming control flow along the path (401), "Collect customer information" to "Process car insurance", has been posted (and not all other truth values have been posted yet). Similar considerations relate to the paths (402, 403).

4.4 Scenarios

The following scenarios for the above example show how these timed start conditions work. It is assumed that a customer has selected all insurance types.

4.4.1 Scenario 1

Assume activity Process Car Insurance completes 5 days, activity Process Life Insurance 7 days, and activity Process House Insurance 10 days after activity Collect Customer Information has started. In this case, the activity Print Contract is started after the last control connector enters the activity; that means activity Process House Insurance has completed. This causes a contract to be printed that contains all three insurance types. This scenario is the ideal case coinciding to with the standard behavior of processing of start conditions.

4.4.2 Scenario 2

Assume activity Process Car Insurance completes 5 days, activity Process Life Insurance 15 days, and activity Process House Insurance 18 days after activity Collect Customer Information has started. In this case, evaluation of the start condition for the activity Print Contract is performed after 14 days not due to the-standard behavior but due to the timed evaluation of start conditions (302). Since the activity Process Car Insurance has been completed, activity Print Contract is carried out for the first time. A contract just containing the car insurance is printed. The activity is carried out a second time after all other control connectors have entered the activity. This happens after 18 days and a contract containing the life and the house insurance is printed.

4.4.3 Scenario 3

Assume activity Process Car Insurance completes 5 days, activity Process Life Insurance 18 days, and activity Process House Insurance 22 days after activity Collect Customer Information has started. In this case, evaluation of the start condition for the activity Print Contract is performed after 14 days. Since the activity Process Car Insurance has been completed, activity Print Contract is carried out for the first time. A contract just containing the car insurance is printed. Since no new control connectors have entered the join activity, the start condition of the activity is evaluated again after 21 days due to the timed evaluation of start conditions (305). Since the activity Process Life Insurance has completed, the start condition evaluates to TRUE, and the activity is carried out a second time. That means a second contract is printed with just the life insurance. The activity is carried out a third time when the activity Process House Insurance completes; that means a third contract that includes the house insurance is printed. This case is the worst cast that still meets the business rules.

The invention claimed is:

1. A computerized method for processing start-conditions processed by a computer system acting as a Workflow-Management-System (WFMS) or a computer system with comparable functionality, said WFMS comprising at least one process-model, said process-model modeling a process comprising one or more process-activities being nodes of an arbitrary graph and directed control-connectors of said graph defining a potential control flow within said process-model; said method being operative to process start-conditions in one of at least a first mode and a second mode the method comprising the steps of:

in the first mode of processing start-conditions, determining if a target-activity representing a work item of said process may be started by evaluating a truth-value of a start-condition once truth-values of all incoming control-connectors of said target-activity have been determined; and said method further comprising a timed-evaluation-step, said timed-evaluation step comprising the steps of:

evaluating if at least a first one of said incoming control-connectors is associated with a time-interval defining a maximum period of time, as measured from a reference point, after which the target-activity is to be started, and evaluating if said time-interval has expired, and, in the affirmative case, said timed-evaluation-step, in the second mode of processing start-conditions, continuing the processing to start said target-activity even if not all truth-values of said incoming control-connectors have been posted determined yet, if the truth-value of said first incoming control-connector has been determined, and if said truth-value evaluates to TRUE the timed-evaluation-step is repeated until all control-connectors of the target activity have been evaluated, and wherein the method implemented on the computer system is by default operative in the first mode, and the second mode is automatically selected when the truth-value of the first incoming control-connector has been determined to be TRUE.

2. A method for processing of start-conditions according to claim 1, wherein said first incoming control-connector is associated with a commencing-activity, the commencing-activity corresponding to one of the process-activities in the process model, and wherein said timed-evaluation-step uses as a starting point for said time-interval the point in time when said commencing-activity is completed.

3. A method for processing of start-conditions according to claim 2, wherein said first incoming control-connector is associated with a path from said commencing-activity to said target-activity, and said timed-evaluation-step is continuing the processing to start said target-activity, if said associated path has been traversed.

4. A data processing system operative for processing start-conditions of one or more process-activities of a process in one of at least a first mode and a second mode, the system comprising means adapted to:

in the first mode of processing start-conditions determine, if a target-activity representing a work item of a process may be started by evaluating a truth-value of a start-condition once truth-values of all incoming control-connectors of said target-activity have been determined; and initiate a timed-evaluation-step, said timed-evaluation step comprising the steps of:

evaluating if at least a first one of said incoming control-connectors is associated with a time-interval defining a maximum period of time, as measured from a reference point, after which the target-activity is to be started, and evaluating if said time-interval has expired, and, in the affirmative case, said timed-evaluation-step, in the second mode of processing start-conditions, continuing the processing to start said target-activity even if not all truth-values of said incoming control-connectors have been determined yet, if the truth-value of said first incoming control-connector has been posted, and if said truth-value evaluates to TRUE the timed-evaluation-step is repeated until all control-connectors of the target activity have been evaluated, and wherein the data processing system is by default operative in the first mode, and the second mode is automatically selected when the truth-value of the first incoming control-connector has been determined to be TRUE.

5. A data processing program for execution in a data processing system for processing start-conditions of one or more process-activities of a process in one of at least a first mode and a second mode, the data processing program comprising software code portions which when executed implement the steps of:

in the first mode of processing start-conditions, determining if a target-activity representing a work item of said process may be started by evaluating a truth-value of a start-condition once truth-values of all incoming control-connectors of said target-activity have been determined; and initiating a timed-evaluation-step, said timed-evaluation step comprising the steps of:

evaluating if at least a first one of said incoming control-connectors is associated with a time-interval defining a maximum period of time, as measured from a reference point, after which the target-activity is to be started, and evaluating if said time-interval has expired, and, in the affirmative case, said timed-evaluation-step, in the second mode of processing start-conditions, continuing the processing to start said target-activity even if not all truth-values of said incoming control-connectors have been determined yet, if the truth-value of said first incoming control-connector has been posted, and if said truth-value evaluates to TRUE the timed-evaluation-step is repeated until all control-connectors of the target activity have been evaluated, and wherein the data processing program implemented on the data processing system is by default operative in the first mode, and the second mode is automatically selected when the truth-value of the first incoming control-connector has been determined to be TRUE.

6. A computer-based process management system comprising at least one process-model, the process-model modeling a process comprising one or more process-activities being nodes of an arbitrary graph and directed control-connectors of the graph defining a potential control flow within the process-model, the system being operative: (i) in a first mode, to determine if a target-activity representing a work item of the process may be started by evaluating a truth-value of a start-condition once truth-values of all incoming control-connectors of the target-activity have been determined; and (ii) to perform a timed-evaluation-step, the timed-evaluation step evaluating:

if at least a first one of the incoming control-connectors is associated with a time-interval defining a maximum period of time, as measured from a reference point, after which the target-activity is to be started, and if the time-interval has expired, and, in the affirmative case, in a second mode, the timed-evaluation-step continuing the processing to start the target-activity even if not all truth-values of the incoming control-connectors have been determined yet, if the truth-value of the first incoming control-connector has been determined, and if the truth-value evaluates to TRUE, the timed-evaluation-step is repeated until all control-connectors of the target activity have been evaluated, and wherein the system is by default operative in the first mode, and the second mode is automatically selected when the truth-value of the first incoming control-connector has been determined to be TRUE.

7. An article of manufacture for processing start-conditions processed by a computer system acting as a Workflow-Management-System (WFMS) or a computer system with comparable functionality, the WFMS comprising at least one process-model, the process-model modeling a process comprising one or more process-activities being nodes of an arbitrary graph and directed control-connectors of the graph defining a potential control flow within the process-model, the article of manufacture comprising a machine readable medium containing one or more programs which when executed implement the steps of:

determining, in a first mode if a target-activity representing a work item of the process may be started by evaluating a truth-value of a start-condition once truth-values of all incoming control-connectors of the target-activity have been determined; and performing a timed-evaluation-step, the timed-evaluation step evaluating:

if at least a first one of the incoming control-connectors is associated with a time-interval defining a maximum period of time, as measured from a reference point, after which the target-activity is to be started, and if the time-interval has expired, and, in the affirmative case, in a second mode the timed-evaluation-step continuing the processing to start the target-activity even if not all truth-values of the incoming control-connectors have been determined yet, if the truth-value of the first incoming control-connector has been posted, and if the truth-value evaluates to TRUE the timed-evaluation-step is repeated until all control-connectors of the target activity have been evaluated.

8. The article of manufacture recited in claim 7, wherein the first incoming control-connector is associated with a commencing-activity, the commencing-activity corresponding to one of the process-activities in the process model, and wherein the timed-evaluation-step uses as a starting point for the time-interval the point in time when the commencing-activity is completed.

9. The article of manufacture recited in claim 7, wherein the first incoming control-connector is associated with a path from the commencing-activity to the target-activity, and the timed-evaluation-step continues processing to start the target-activity, if the associated path has been traversed.

10. A computerized method for processing start-conditions of one or more process-activities in a computer system operative as a workflow management system (WFMS), the WFMS comprising at least one process-model for representing a process, the process-model forming an arbitrary graph comprising a plurality of nodes and corresponding control-connectors, each of the process-activities being represented by a given one of the nodes in the arbitrary graph and each of the control-connectors defining a potential control flow within the process-model, the method comprising the steps of:

in a first mode of processing, determining whether a target-activity representing a work item of the process may be started by evaluating a truth-value of a start-condition once truth-values of all incoming control-connectors of the target-activity have been determined; and performing a timed-evaluation procedure, the timed-evaluation procedure comprising:

determining whether at least a first one of the incoming control-connectors of the target-activity is associated with a time-interval, the time-interval specifying a maximum period of time, as measured from a specified reference point, after which the target-activity is to be started;

when the first incoming control-connector is associated with a time-interval, determining whether the time-interval has expired;

when the time-interval has expired, in a second mode of processing, continuing the processing to start the target-activity even if the truth-values of all the incoming control-connectors have not yet been determined; and repeating the timed-evaluation procedure for another one of the control-connectors, until all of the control-connectors of the target-activity have been evaluated;

wherein the second mode of processing is automatically selected when the truth-value of the first incoming control-connector has been posted, and when the truth-value evaluates to TRUE.

* * * * *

UNITED STATES PATENT AND TRADEMARK OFFICE

CERTIFICATE OF CORRECTION

PATENT NO. : 7,024,670 B1
APPLICATION NO. : 09/396245
DATED : April 4, 2006
INVENTOR(S) : F. Leymann et al.

It is certified that error appears in the above-identified patent and that said Letters Patent is hereby corrected as shown below:

Column 10,
Line 3, delete the hard return after "the".

Column 12,
Line 34, after "TRUE" insert -- : --.

Column 13,
Lines 14 and 48, after "TRUE" insert -- : --.

Column 14,
Line 13, after "TRUE" delete "," and insert -- : --.
Line 51, after "TRUE" insert -- : --.

Signed and Sealed this

Eighteenth Day of July, 2006

JON W. DUDAS
*Director of the United States Patent and Trademark Office*